United States Patent

[11] 3,580,604

| [72] | Inventor | Thomas F. Overend |
| | | 4379 Dart Ave., Minneapolis, Minn. 55424 |
| [21] | Appl. No. | 859,132 |
| [22] | Filed | Sept. 18, 1969 |
| [45] | Patented | May 25, 1971 |

[54] MUD FLAPS FOR DUMP TRUCKS
8 Claims, 3 Drawing Figs.

[52] U.S. Cl. .................................................... 280/154.5, 298/1
[51] Int. Cl. .................................................... B62d 25/16
[50] Field of Search .......................................... 280/154.5; 298/1 (SG)

[56] References Cited
UNITED STATES PATENTS

| 2,940,773 | 6/1960 | Eaves ............................ | 280/154.5 |
| 3,165,360 | 1/1965 | Saxton et al. ................... | 298/1 |
| 3,310,344 | 3/1967 | Beintum et al. ................. | 298/1 |
| 3,337,238 | 8/1967 | Weasel, Jr. ..................... | 280/154.5 |

*Primary Examiner*—Benjamin Hersh
*Assistant Examiner*—Robert R. Song
*Attorney*—Williamson, Palmatier & Bains ABSTRACT: A two-part mud flap assembly for dump trucks, one flap being adjacent the upper portion of the wheel and being stationary with the truck frame; the other lower flap normally lapping the upper flap and slidable into confronting relation with the upper flap. A swingable arm mounting the lower flap normally held down by the dump box; a spring to swing the arm and lower flap upwardly as the dump box is raised.

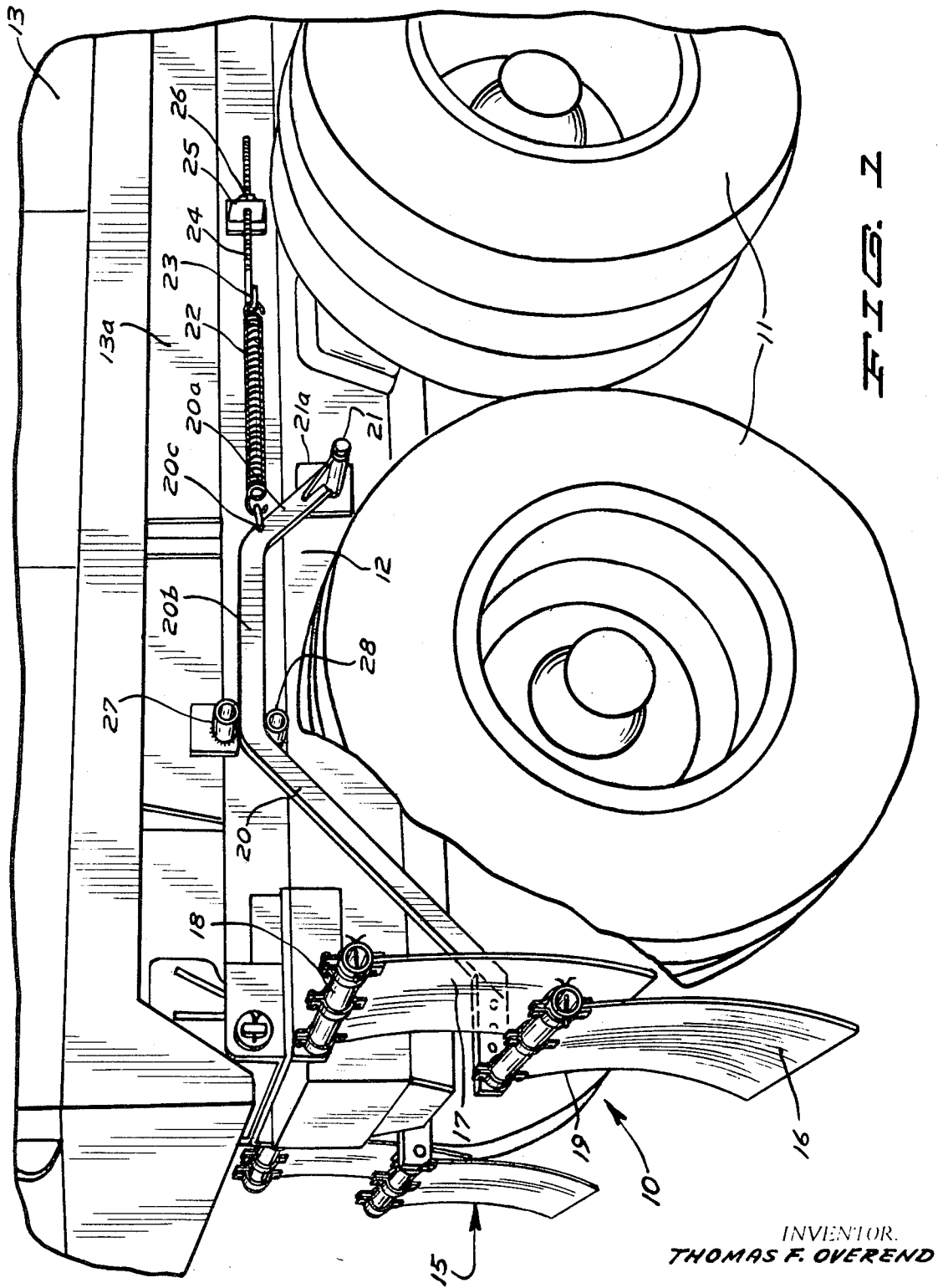

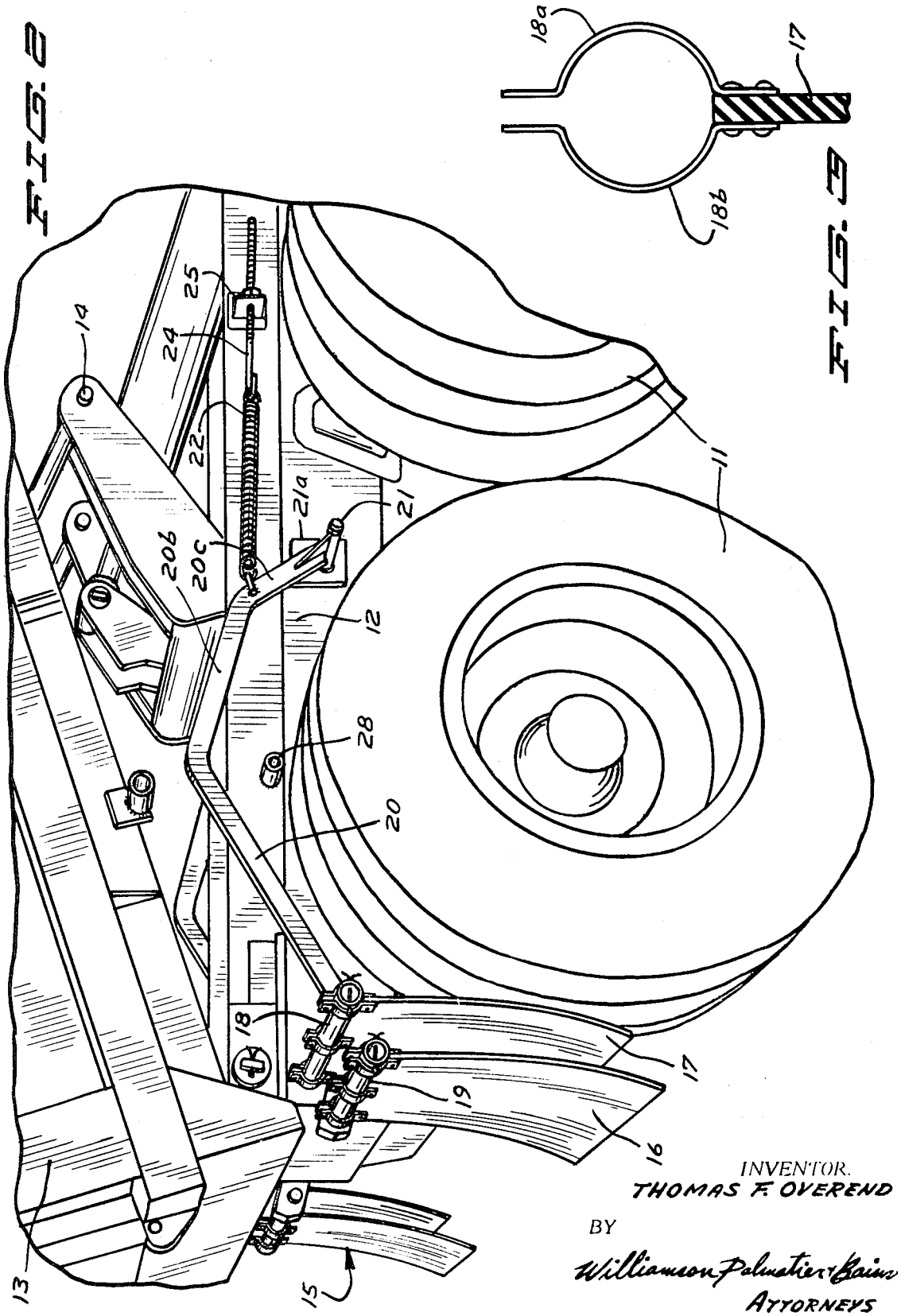

3,580,604

1

MUD FLAPS FOR DUMP TRUCKS

BRIEF SUMMARY OF THE INVENTION

The mud flap assembly has a stationary upper flap and an upwardly retractable lower flap behind each rear wheel of a dump truck. Both upper and lower flaps have cantilever mounts; the upper flap mount being supported directly by the truck frame. The lower flap mount is on an upwardly swingable arm pivoted to the truck frame well ahead of the flaps. The arm and lower flap are mechanically held down by the dump box; and the arm and lower flap are raised by a spring when the dump box is raised.

The present invention provides the advantages of preventing mud flap tear-offs when the dump truck is operated in a reverse direction with the dump box raised for dumping into or adjacent a pile of materials which the wheels move into; and the mud flap continues to be effective even when the box is raised for spreading sand or other materials when the truck is moving forwardly down the street. In addition, the present invention is very nearly maintenance free, because there is no power required, nor are there any delicate operating parts or mechanisms which need to be replaced or adjusted, or which would be affected by mud, slop and sand which are encountered in highway work. Although the mud flaps in the present invention will not be torn off, they are subjected to the usual wear, and are readily replaceable when such replacement is needed.

BRIEF DESCRIPTION OF DRAWINGS

FIG. 1 is a perspective view of the invention shown attached to a dump truck and shown in condition for highway travel.

FIG. 2 is a perspective view of the present invention with the mud flap retracted and the dump box raised for rearward travel of the truck into a stack for dumping the load from the dump box.

FIG. 3 is an enlarged detail section view of the flap mount.

DETAILED DESCRIPTION OF INVENTION

One form of the invention is shown in the drawings and is described herein. The lower rear portion of a dump truck is illustrated in FIGS. 1 and 2 and is indicated in general by the numeral 10. The dump truck includes tandem rear drive wheels 11, a frame 12, and a dump box 13 which has a reinforcing frame 13a which is really a part of the dump box. As illustrated in FIG. 2, the dump box, as well as its supporting subframe 13a, tilts upwardly for dumping the load that is carried in the box. The dump truck 10 has the usual operating linkage 14 for raising and lowering the dump box.

The mud flap assemblies 15 for the opposite sides of the truck are essentially identical. Each assembly includes a pair of mud flaps 16 and 17 which are made of thick reinforced rubber sheeting or similar plastic or fabric material. The upper flap 17 is suspended in a stationary position, just rearwardly of the upper portion of the rear wheels 11 of the truck. The lower flap 16 is normally disposed adjacent the lower portion of the rear wheel of the truck, and with the upper edge of the lower flap 16 in overlapping relation with the lower portion of the upper flap 17. The upper flap 17 is mounted on a rigid tube or cantilever 18 the inner end of which is affixed as by welding as illustrated to the frame 12 of the truck. Of course, the rigid cantilever 18 may have a mounting plate at its inner end to facilitate easier attachment to the frame, but, in any event, the cantilever 18 is rigid with the frame of the truck after it is originally installed. The upper flap 17 has spring clips 18a and 18b which are identical to each other and which are shaped to correspond to the peripheral shape of the cantilever 18 so that the clips will fit snugly therearound and support the flap 17 on the cantilever. The flap 17 has several sets of the spring clips 18a and 18b which cooperate with each other in suspending the flap.

As illustrated, the lower flap 16 has spring clips which are identical to those mounted on the upper flap 17.

2

By means of the clips, the lower flap 16 is mounted on a rigid tube or cantilever 19 which extends across the top of the flap 16 and rearwardly of the wheels 11 of the truck. The inner end of the cantilever or mounting tube 19 is affixed to an elongate mounting arm 20 which extends longitudinally along the truck frame 12 and is disposed between the frame 12 and the innermost of the dual wheels 11. The rigid arm 20 is constructed of square structural tubing, and is swingably mounted on a pivot pin 21 which is affixed to the truck frame 12, to provide for vertical swinging of the arm 20 between the position shown in FIG. 1 to that illustrated in FIG. 2. The pivot pin 21 has a mounting plate 21a which is affixed as by welding to the frame 12 of the truck. The rear portion 20a of the mounting arm extends obliquely rearwardly and upwardly from the pivot pin 21 to the intermediate portion 20b which extends along the lower portion of the dump box frame 13a. An elongate tension spring 22 has one end connected to rigid ears 20c which are a part of the arm 20, and the opposite end of the spring 22 is anchored to an adjustable bracket 23 carried on a threaded rod 24 which extends through an apertured ear 25 on the frame 12 of the truck. A lock nut 26 on the threaded rod 24 bears against the stationary ear 25 to fix the tension on the spring 22 which tends to swing the arm 20 upwardly and to raise the lower flap 16.

Normally the arm 20 is restrained against upward swinging under the influence of spring 22 by a rigid lug 27 which is affixed to the lower portion of the box 13, and specifically in the form illustrated the lug 27 is affixed as by welding to the box frame 13a. The lug 27 is in the form of a short length of rigid tubing, and continuously bears downwardly against the intermediate portion 20b of the arm 20 when the box 13 is in its lowered position. The flap 16 is thereby prevented from moving upwardly and will act as the mud flap for the lower portion of the wheels 11 of the truck.

It is to be noted that the cantilever 19 is disposed slightly rearwardly of the cantilever 18 and the arm 20 extends beneath the inner end of cantilever 18 such that as the arm 20 is swung upwardly to the position illustrated in FIG. 2, the arm will engage the inner end of the cantilever 18 and be restrained from additional upward movement thereby. The lug 27 swings clear of the arm 20, and the arm is retained against the inner end of cantilever 18 by the spring 22.

When the dump box swings downwardly from the position illustrated in FIG. 2, the lug 27 engages and cams along the intermediate portion of the arm 20 so as to swing the arm to its normal position illustrated in FIG. 1. As the arm swings downwardly it approaches a stop lug 28, also in the form of a short length of rigid tubing which is mounted on the frame 12 of the truck so as to prevent any excessive downward movement of the arm which might be caused by too rapid movement or bouncing, or otherwise. Even though the truck may travel rough roads and be bounced around under high speeds and an unloaded condition, the flap 16 will be retained in the position illustrated in FIG. 1 by the lugs 27 and 28 acting against the arm 20 which restrain any movement thereof.

In operation, the mud flaps 16 and 17 operate in a rather conventional way during travel of the truck in a forward direction along highways or roads. It should be noted, however, that the flaps 16 and 17 are somewhat shorter than the usual mud flaps used on trucks and, as a result, will have less tendency to swing rearwardly under influence of the wind and air in the vicinity of the wheel. As a result, the lower edge of the bottom flap 16 will be retained in rather close relationship to the highway surface.

The upper flap 17 will be normally swung rearwardly slightly against the upper edge portion of the lower flap 16 and against the rigid tubular mount or cantilever 19; and the effect of the two flaps 16 and 17 operating together will be an efficient flap, in most instances more efficient than the usual mud flaps found on other types of trucks which are mounted from a single frame element at the top edge.

Upward and downward swinging movement of the arm 20 is prevented by the lugs 27 and 28, and the spring 22 tends to urge the arm continuously upwardly against the lug 27. When the loaded dump box is to be emptied, it is conventional that the truck 10 will be moved rearwardly to the dump area which oftentimes has one or more piles of material which has been previously dumped. During the rearward motion of the truck, it is conventional for the driver to elevate the box and, as a result of the raising of the box, the lug 27 is first swung upwardly in engagement with the arm 20 which will immediately start to swing upwardly under the influence of the spring 22, and then as the box 13 is swung upwardly to its full extent, the lug 27 will actually swing away from the arm 20.

As the arm 20 swings upwardly under influence of the spring 22, the cantilever 19 will raise the lower flap 16 out of simply overlapping relation with the upper flap 17, and into substantially fully confronting relation with the upper flap 17 until the arm 20 engages the inner end of the cantilever 18. This occurs as the truck is backing and as the dump box 13 is being elevated, and by the time the truck has reached the location where the load is to be dumped and where piles of material are likely to be encountered, the lower flap 16 is out of the way so that when the wheels 11 run into the pile of material, the lower flap will not engage the material and will not be squeezed between the material and the wheels 11. The material will then simply be dumped from the box, and then, as the truck moves forwardly and the box is being lowered again, the lug 27 engages the intermediate portion 20b of the arm and swings the arm downwardly and moves the lower flap 16 downwardly adjacent the road surface and adjacent the lower portion of the rear wheel 11.

It should further be noted that, on occasion, the truck will be operated in a forward direction with the box elevated, for purposes of sprinkling sand onto the road, or for other similar maintenance purposes. In this situation, the box will be raised and the lug 27 will allow the spring 22 to swing the arm outwardly, but even though the lower flap 16 is raised to its upper position shown in FIG. 2, the flaps 16 and 17 combine to provide the usual protection that a mud flap is supposed to provide, against rearwardly flying stones and gravel caused by rotation of the wheels 11 along the highway. In spite of the fact that the mud flaps are retracted to an out-of-the-way position, they are still effective for operating as mud flaps.

It will be seen that I have provided a new and improved mud flap assembly for dump trucks wherein an upper flap is continuously in operation and wherein a lower portion of the flap is lifted when the dump box is raised so as to prevent the flaps from being torn off when the rear wheels of the truck back into a pile of material so as to continuingly provide mud flap protection during forward travel of the truck along the highway.

What I claim is:

1. A mud flap assembly for trucks with tiltable dump boxes, comprising a pair of flaps to be suspended respectively adjacent the upper and lower portions of the truck rear wheels, means mounting the upper flap in substantially stationary position, an upwardly swingable arm having a rear end mounting said lower flap for vertical movement into substantially confronting relation with the upper flap to avoid being moved against the rear wheel as the truck is moving rearwardly, the arm extending forwardly along a portion of the dump box of the truck to a pivot mounting the arm for vertical swinging, and means for swinging the arm as the dump box is raised and lowered, and including a lug movable with the box in operating the arm.

2. The mud flap assembly according to claim 1 and said lug being mounted on the dump box and engaging the arm to produce movement thereof.

3. The mud flap assembly according to claim 1 and said arm changing its angular orientation during swinging thereof, said lug simultaneously bearing against the arm and camming therealong as the dump box is moved to move the arm and lower flap.

4. The mud flap assembly according to claim 1 and a spring connected with the arm and moving and holding the arm against said lug, the lug and spring respectively swinging the arm in opposite directions.

5. The mud flap assembly according to claim 4 and said lug urging the arm downwardly and the spring urging the arm upwardly to lift the lower flap as the dump box is raised, said lug holding the arm and lower flap downwardly, against the force of the spring when the dump box is in lowered position.

6. The mud flap assembly according to claim 1 and the arm having a rigid cantilever affixed thereto and extending transversely therefrom and suspending the lower flap therefrom.

7. The mud flap assembly according to claim 6 and the lower portion of the upper flap overlapping the upper portion of the lower flap and confronting said cantilever.

8. The mud flap assembly according to claim 6 and including a stationary cantilever mounting the upper flap, the arm underlying said stationary cantilever to be restrained in upper movement thereby when the lower flap is raised.